United States Patent
Han et al.

(10) Patent No.: US 8,916,672 B2
(45) Date of Patent: Dec. 23, 2014

(54) TRANSPARENT POLYARYLENE ETHER POLYMER WITH HIGH HEAT RESISTANCE AND METHOD FOR PREPARING THE SAME

(75) Inventors: Yang Kyoo Han, Seoul (KR); Gyoung Pyo Kong, Ulsan (KR); Moon Ki Kim, Gyeonggi-do (KR); Bo Ra Hong, Seoul (KR); Hyun Aee Chun, Gyeonggi-do (KR)

(73) Assignee: ICUF-HYU (Industry-University Cooperation Foundation Hanyang University), Seoul (KR)

( * ) Notice: Subject to any disclaimer, the term of this patent is extended or adjusted under 35 U.S.C. 154(b) by 187 days.

(21) Appl. No.: 13/388,783

(22) PCT Filed: Dec. 10, 2010

(86) PCT No.: PCT/KR2010/008857
§ 371 (c)(1),
(2), (4) Date: Feb. 3, 2012

(87) PCT Pub. No.: WO2011/071340
PCT Pub. Date: Jun. 16, 2011

(65) Prior Publication Data
US 2012/0130041 A1 May 24, 2012

(30) Foreign Application Priority Data
Dec. 11, 2009 (KR) ........................ 10-2009-0123540

(51) Int. Cl.
*C08G 8/02* (2006.01)
*C08G 14/00* (2006.01)
*C08G 75/00* (2006.01)
*C08G 75/23* (2006.01)
*C08G 65/40* (2006.01)

(52) U.S. Cl.
CPC ............ *C08G 65/4012* (2013.01); *C08G 75/23* (2013.01)
USPC .......................................... 528/125; 528/174

(58) Field of Classification Search
USPC ................................................ 528/125, 174
See application file for complete search history.

(56) References Cited

U.S. PATENT DOCUMENTS

| | | | |
|---|---|---|---|
| 4,745,225 A | 5/1988 | Ude et al. | |
| 4,889,909 A | 12/1989 | Besecke et al. | |
| 4,990,588 A | 2/1991 | Knebel et al. | |
| 5,166,305 A * | 11/1992 | Park et al. | 528/125 |
| 6,136,929 A | 10/2000 | Han et al. | |
| 2003/0104259 A1 | 6/2003 | Oguri et al. | |
| 2004/0236062 A1 | 11/2004 | Hofmann | |
| 2005/0208416 A1 * | 9/2005 | Bender | 430/270.1 |
| 2007/0049724 A1 * | 3/2007 | Brunelle et al. | 528/373 |
| 2007/0117962 A1 * | 5/2007 | Steiger et al. | 528/373 |

FOREIGN PATENT DOCUMENTS

JP    2006-104382 A    4/2006

OTHER PUBLICATIONS

International Search Report for International Application No. PCT/KR2010/008857, mailed Aug. 30, 2011.
Supplementary European Search Report for Application No. EP 10 83 6235 dated Oct. 4, 2013.
International Preliminary Report on Patentability/Written Opinion for Application No. PCT/KR2010/008857 dated Jun. 21, 2012.

* cited by examiner

*Primary Examiner* — Liam J Heincer
(74) *Attorney, Agent, or Firm* — Alston & Bird LLP

(57) ABSTRACT

The present disclosure relates to a transparent polyarylene ether polymer with high heat resistance and a method for preparing the same. More particularly, the present disclosure relates to a polyarylene ether polymer and a method for preparing the same, wherein the polyarylene ether polymer has a repeating structure in which cardo-type aromatic diols having a large molecular volume, polyether sulfones which are amorphous polymers having a high glass transition temperature and superior film formability, and polyether ketones which are crystalline polymers having superior heat resistance and mechanical properties are sequentially arranged. The polyarylene ether polymer is both transparent and heat resistant and, thus, can be used, for example, for a flexible plastic substrate.

15 Claims, No Drawings

TRANSPARENT POLYARYLENE ETHER POLYMER WITH HIGH HEAT RESISTANCE AND METHOD FOR PREPARING THE SAME

CROSS REFERENCE TO RELATED APPLICATIONS

This application is a national stage application filed under 35 U.S.C. 371 of International Application No. PCT/KR2010/008857, filed Dec. 10, 2010, which claims priority from Korean Patent Application No. 10-2009-0123540, filed Dec. 11, 2009, each of which is incorporated herein in its entirety.

TECHNICAL FIELD

The present disclosure relates to a polyarylene ether polymer and a method for preparing the same. More particularly, the disclosure relates to a novel polyarylene ether polymer which is both transparent and heat resistant and, thus, can be used, for example, for a flexible plastic substrate, and a method for preparing the same.

BACKGROUND ART

Transparent polymer materials with high heat resistance are key materials of the next-generation high-technology industry. They are expected to be widely used in flexible substrates for displays, solar cells and electronic paper, as well as in the aerospace industry and semiconductor industry. In particular, the megatrend of the display, solar cell and electronic paper industries, where the transparent new materials with high heat resistance are used predominantly, in the future will be ubiquitousness with various functions fused, as well as flexibility, large size and high image quality. Accordingly, the demand on the transparent plastic substrate materials with high heat resistance is expected to exceed some 10 billion dollars in 10 years.

Thus, companies in advanced countries, including Ferrania Image Technologies of Italy, Promerus, General Electric (GE) and DuPont of USA, Mitsubishi Gas Chemical, Sumitomo Bakelite and Teijin Films of Japan, and BASF of Germany, are developing transparent optical film materials with high heat resistance for flexible plastic substrate materials.

In terms of morphology, the developed materials may be classified into crystalline polymers and amorphous polymers. Among the materials, the aromatic polyester-based crystalline polymers polyethylene terephthalate (PET) and polyethylene naphthalate (PEN) developed early by DuPont and Teijin Films have relatively low glass transition temperature ($T_g$) is relatively low with 80 and 150° C., respectively, but the melting temperature ($T_m$) is very high with 253 and 265° C., respectively. Also, due to their crystalline structure, they are very poorly soluble in solvents and thus it is difficult to prepare transparent films for flexible substrate materials by melting or solvent casting. Besides, mechanical properties such as modulus and coefficient of thermal expansion (CTE) are degraded drastically at temperatures higher than the $T_g$ of the polymer materials. That is, the modulus decreases whereas CTE (ppm/° C.) increases. Accordingly, in order to use PET or PEN for flexible plastic substrate materials, it is required to modify the mechanical properties using glass fiber and coat both sides of the substrate material with acrylate-based cross-linked polymers to reduce water absorption and oxygen permeability.

For use as the flexible plastic substrate material for next-generation displays, solar cells, electronic paper, etc., active matrix (AM) type high-quality display should be realizable. In order to realize the AM display, conductive indium tin oxide (ITO) should be deposited on a transparent plastic substrate material at high temperature of 180° C. or above and a silicon substrate type, highly integrated thin-film transistor (TFT) should be fabricated. Accordingly, amorphous polymer materials with new structure having superior heat resistance, low CTE and hygroscopy, good transparency and good film formability have been developed.

Examples include Ferrania's polyacrylate (PAR) polymers, Promerus' cycloolefin polymers (COP/COO), GE and Mitsubishi Gas Chemical's polyimide (PI) polymers, and Sumitomo and BASF's polyether sulfone (PES) polymers.

Among them, Promerus' cross-linked polynorbornene COP (product name: Appear 3000) has good $T_g$, light transmittance and hygroscopy, but has a very high CTE. In contrast, Ferrania's PAR (product name: Arylite) has good $T_g$, light transmittance and hygroscopy, as well as very low CTE at high temperatures. Mitsubishi Gas Chemical's PI (product name: Neopulim L-3430) has good $T_g$ and light transmittance as well as very superior CTE at high temperature, but hygroscopy is very high. And, Sumitomo's PES has relatively low $T_g$, but good light transmittance and hygroscopy and very superior CTE at high temperature.

In Korea, I-Component has developed optical films for display substrates using BASF's PES resin.

DISCLOSURE

Technical Problem

The present disclosure is directed to providing a novel polyarylene ether polymer with transparency and high heat resistance that can be used as a flexible plastic substrate material processable into an active matrix thin-film transistor (AM-TFT) for next-generation displays, solar cells and electronic paper.

The present disclosure is also directed to providing a method for preparing the polyarylene ether polymer.

Technical Solution

In one general aspect, the present disclosure provides a polyarylene ether polymer including a repeat unit represented by the chemical formula (1a) or (1b) and at least one cardo-type aromatic diol monomer:

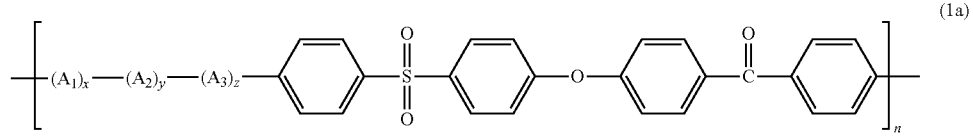

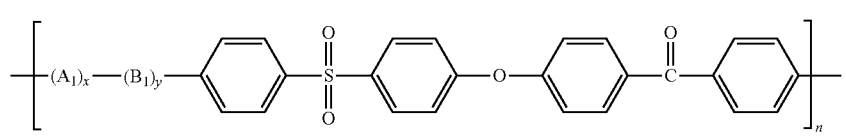

wherein $A_1$, $A_2$ and $A_3$ are cardo-type aromatic diol monomers, $B_1$ is a non-cardo-type aromatic diol monomer, in the formula (1a), $x+y+z=1$, $0<x\leq 1$, $0\leq y<1$ and $0\leq z<1$, in the formula (1b), $x+y=1$, $0<x\leq 1$ and $0\leq y<1$, and n is an integer from 1 to 780.

In an exemplary embodiment of the present disclosure, the polymer may have a number-average molecular weight of 3,000-500,000.

In an exemplary embodiment of the present disclosure, the cardo-type aromatic diol monomer may be selected from the compounds of the chemical formulae (d-1) to (d-6):

(d-1)

(d-2)

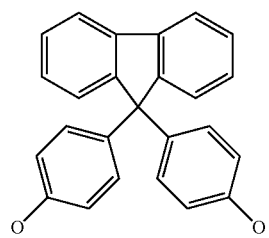

(d-3)

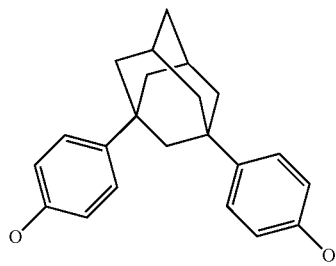

(d-4)

(d-5)

(d-6)

In an exemplary embodiment of the present disclosure, the non-cardo-type aromatic diol monomer is selected from the compounds of the chemical formulae (d-7) to (d-9):

(d-7)

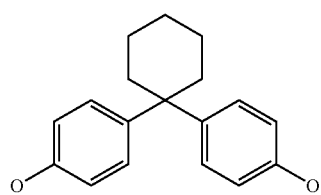

(d-8)

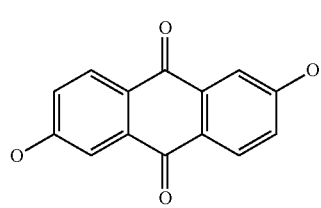

(d-9)

In another general aspect, the present disclosure provides a method for preparing the polyarylene ether polymer of the chemical formula (1a) or (1b), including condensation polymerizing one or more aromatic diol salt with an aromatic dihalogen compound at molar equivalence ratio in a polar solvent via nucleophilic substitution.

In an exemplary embodiment of the present disclosure, the aromatic diol salt used in the preparation of the polyarylene ether polymer may be prepared by reacting an aromatic diol with an alkali metal base. The alkali metal base may be one or more selected from a group consisting of NaOH, KOH and $K_2CO_3$. Specifically, the alkali metal base may be used in an amount of 1.0-10 wt % in excess based on the cardo-type aromatic diol.

The aromatic diol may be one or more selected from a cardo-type aromatic diol compound including 9,9-bis(4-hydroxyphenyl)fluorene (BPF), 1,3-bis(4-hydroxyphenyl)adamantane (BPA), 1,1'-bis(4-hydroxyphenyl)cyclohexane (BPC), 2,6-dihydroxyanthracene-9,10-dione (DHAD) and 9,9-bis(4-aminophenyl)fluorene-4-hydroxy-phhalimide (BAF-HPI) or a non-cardo-type monomer including 1,5-naphthalenediol (1,5-NP), 2,6-naphthalenediol (2,6-NP) and 4,4'-bisphenol (BP).

In an exemplary embodiment of the present disclosure, the halogen of the aromatic dihalogen compound may be fluorine or chlorine. Especially, 4-fluoro-4'-(4-fluorobenzoylphenyloxy)diphenylsulfone may be used.

In an exemplary embodiment of the present disclosure, the polar solvent may be one or more selected from a group consisting of dimethylformamide (DMF), dimethylacetamide (DMAc), dimethyl sulfoxide (DMSO), diphenylsulfone (DPS), hexamethylphosphoramide (HMPA) and sulfolane. The condensation polymerization may be carried out at 150-250° C. for 3-12 hours.

Advantageous Effects

The polyarylene ether polymer according to the present disclosure which is both transparent and heat resistant is suitable as a flexible plastic substrate material for use in next-generation roll-type displays, solar cells and electronic paper.

BEST MODE

Hereinafter, the embodiments of the present disclosure will be described in detail.

The polyarylene ether polymer according to the present disclosure has a repeating structure in which cardo-type aromatic diols having a large molecular volume, polyether sulfones which are amorphous polymers having a high glass transition temperature and superior film formability, and polyether ketones which are crystalline polymers having superior heat resistance and mechanical properties are sequentially arranged. The polyarylene ether polymer is both transparent and heat resistant.

In general, the polymers having a structure in which aromatic groups with strong interactions between polymer chains have a glass transition temperature, very superior heat resistance, low coefficient of thermal expansion (CTE) and superior mechanical properties including tensile strength and modulus. However, since the polymer chains tend to cluster to form crystalline structure, films prepared from the polymers have poor transparency. That is to say, the heat resistance of a polymer is inversely proportional to its transparency.

In order to solve this problem, the inventors have prepared a novel poly(arylene ether) polymer which is both transparent and heat resistant by synthesizing a novel aromatic diol monomer in which a cardo-type group with a large molecular volume is flanked by aromatic groups and a novel aromatic dihalogen monomer in which sulfone, ether and ketone groups are alternatingly introduced between aromatic groups and condensation polymerizing the monomers via nucleophilic substitution.

The cardo-type group with a large free volume and the flexible groups such as sulfone and ether interrupt the formation of crystalline structure by decreasing interactions between the aromatic polymer chains, leading to an amorphous structure with superior transparency. Also, the introduction of the non-cardo-type aromatic diol and aromatic ether ketone groups in the polymer chain compensates for the decrease in heat resistance caused by the formation of the amorphous structure. As a result, a novel polymer material which is transparent, highly heat resistant, less hygroscopic and less contractive could be prepared. In other words, the present disclosure provides an amorphous polyarylene ether polymer with a novel structure in which cardo-type polyether phenylene or non-cardo-type polyether perylene, amorphous polyether sulfone and crystalline polyether ketone are sequentially arranged.

The polyarylene ether polymer according to the present disclosure comprises a repeat unit represented by the chemical formula (1a) or (1b) and at least one cardo-type aromatic diol monomer:

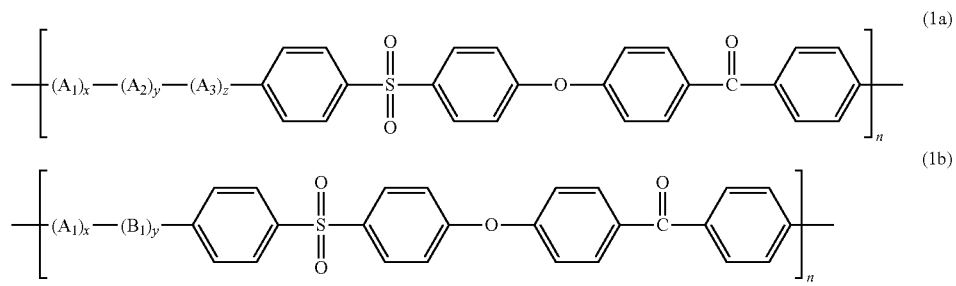

wherein $A_1$, $A_2$ and $A_3$ are cardo-type aromatic diol monomers, $B_1$ is a non-cardo-type aromatic diol monomer, in the formula (1a), $x+y+z=1$, $0<x\leq 1$, $0\leq y<1$ and $0\leq z<1$, in the formula (1b), $x+y=1$, $0<x\leq 1$ and $0\leq y<1$, and n is an integer from 1 to 780.

The polymer may have a number-average molecular weight of 3,000-500,000.

The cardo-type aromatic diol monomer may be selected from the compounds of the chemical formulae (d-1) to (d-6):

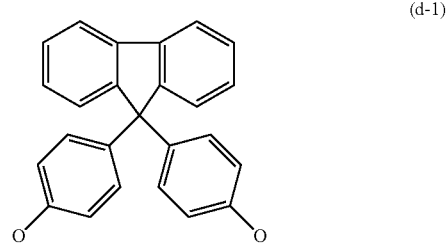

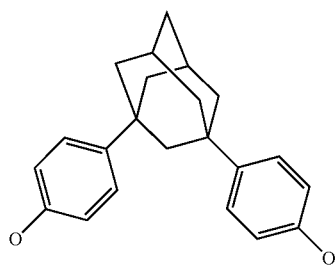
(d-2)
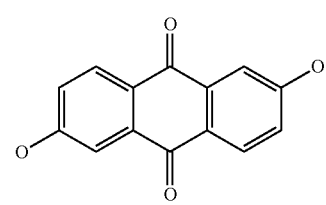
(d-3)
(d-4)
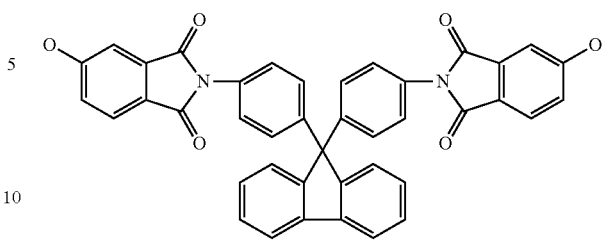
(d-6)
The non-cardo-type aromatic diol monomer may be selected from the compounds of the chemical formulae (d-7) to (d-9):
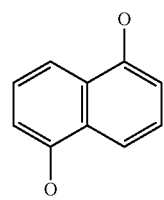
(d-7)
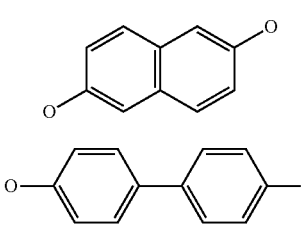
(d-8)
(d-9)
(d-5)
Specifically, the polyarylene ether polymer according to the present disclosure may be a polymer comprising a repeat unit selected from those represented by the chemical formulae (2) to (12):
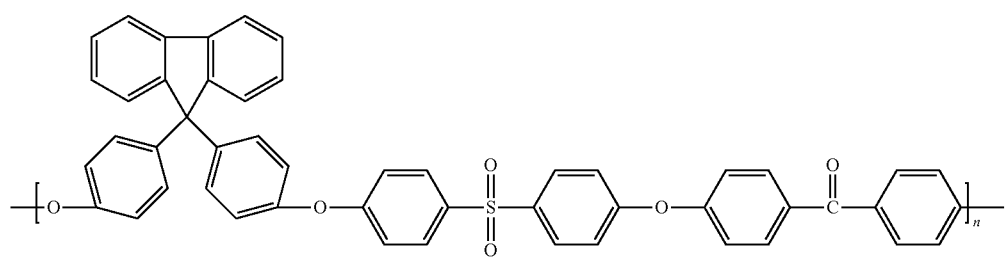
(2)
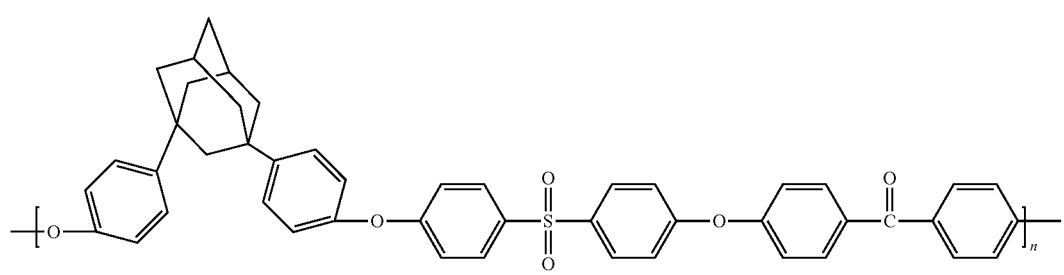
(3)

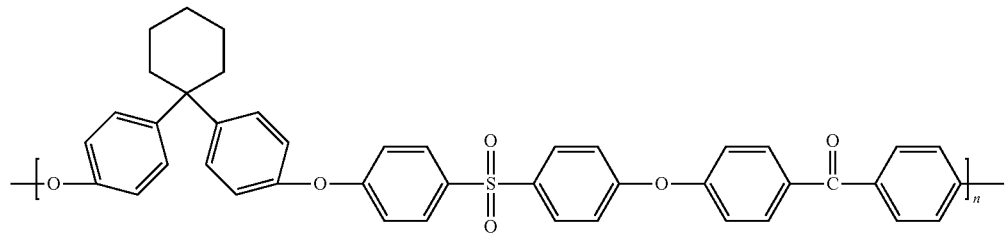
(4)
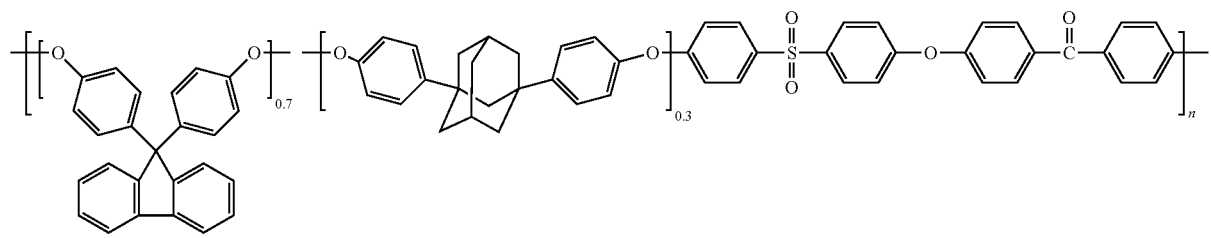
(5)
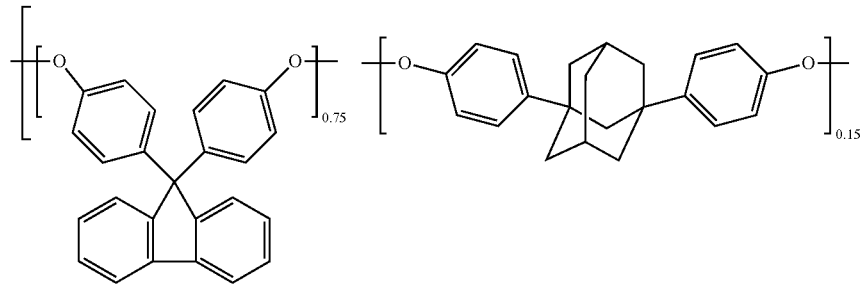
(6)
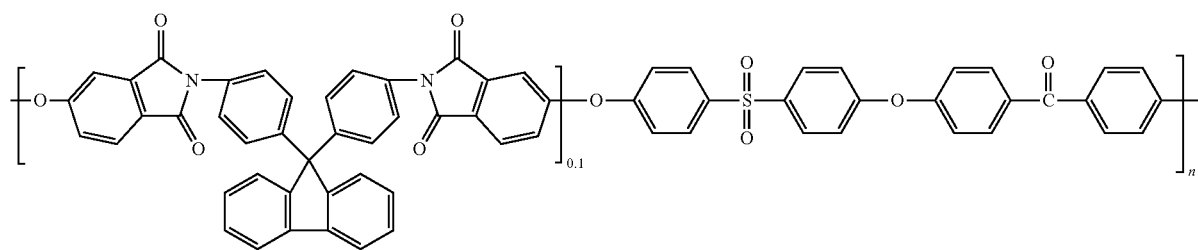
(7)
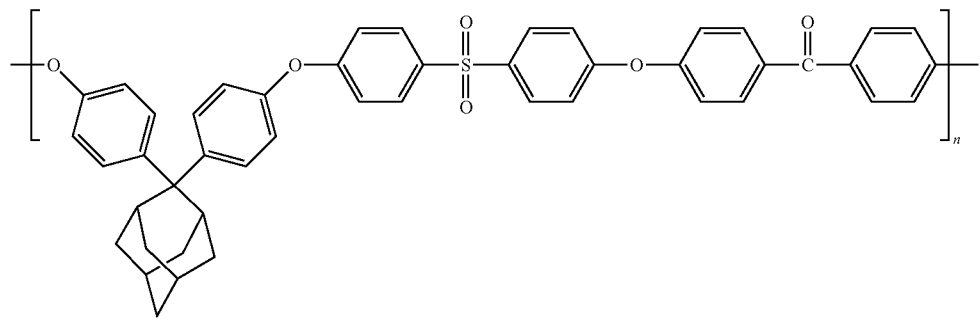

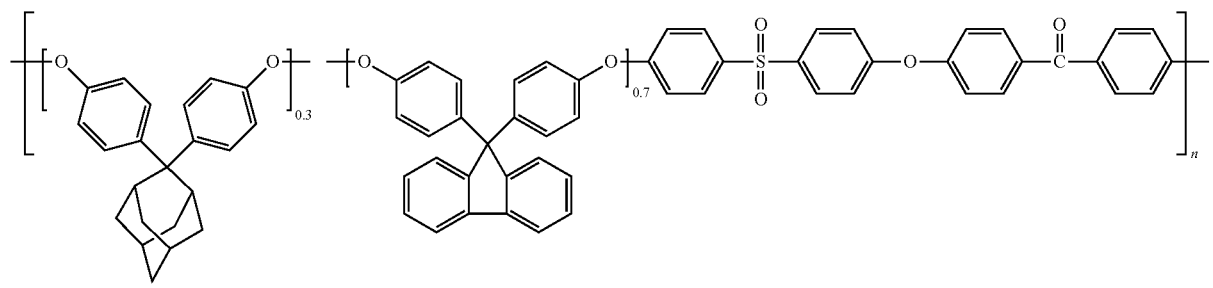
(8)
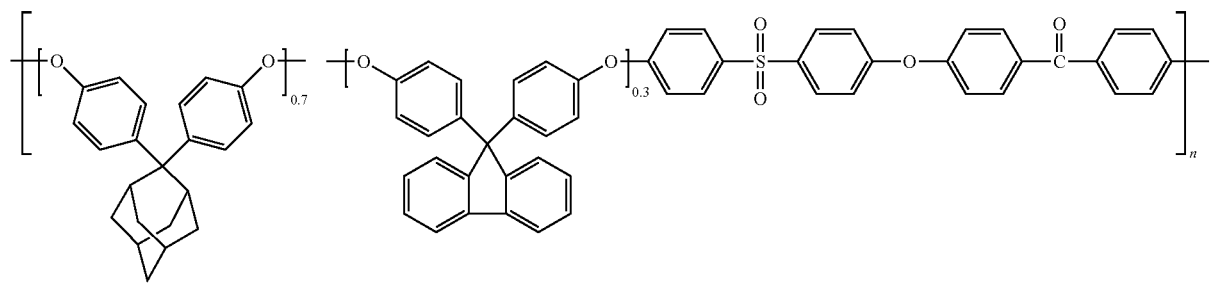
(9)
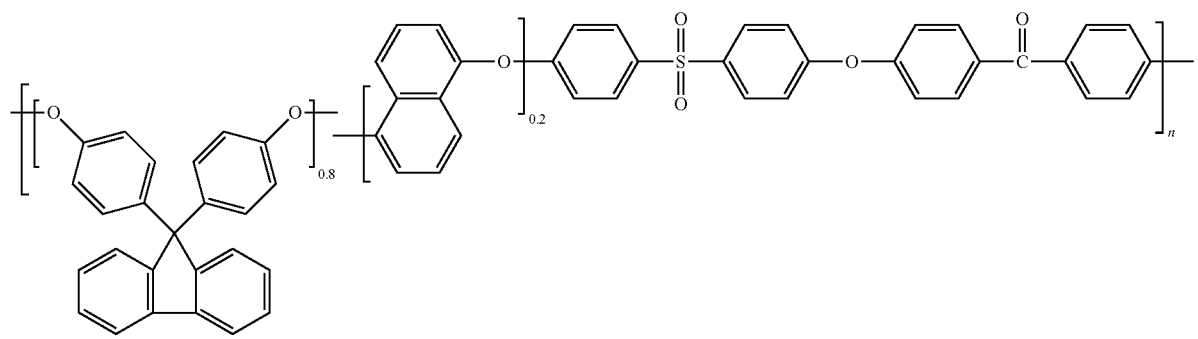
(10)
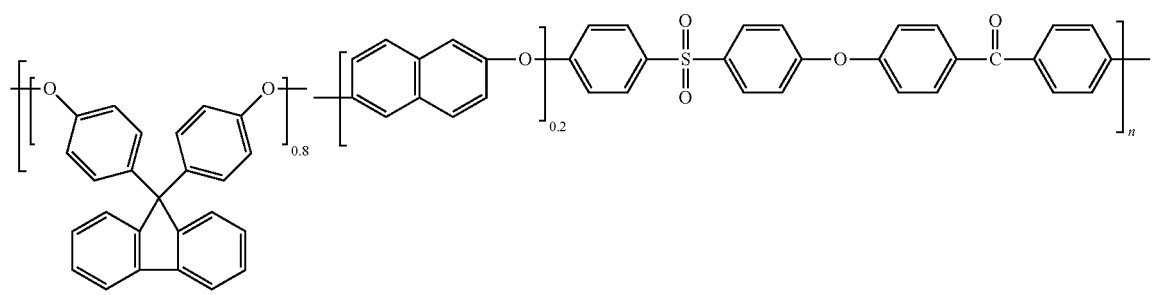
(11)
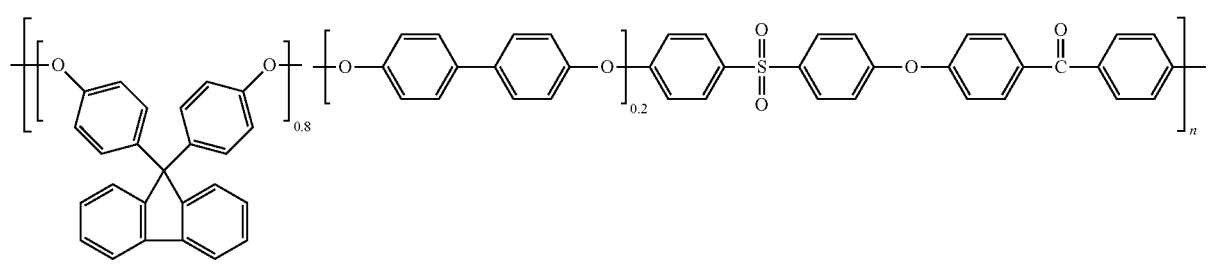
(12)
And, the polyarylene ether polymer of the chemical formula (1a) or (1b) according to the present disclosure may be prepared by condensation polymerizing one or more aromatic diol salt with an aromatic dihalogen compound at molar equivalence ratio in a polar solvent via nucleophilic substitution.

The aromatic diol salt used in the preparation of the polyarylene ether polymer may be prepared by reacting an aromatic diol with an alkali metal base in a polar solvent. For example, it may be prepared by reacting a cardo-type aromatic diol compound such as 9,9-bis(4-hydroxyphenyl)fluorene (BPF), 1,3-bis(4-hydroxyphenyl)adamantane (BPA), 1,1'-bis(4-hydroxyphenyl)cyclohexane (BPC), 2,6-dihydroxyanthracene-9,10-dione (DHAD) or 9,9-bis(4-aminophenyl)fluorene-4-hydroxy-phhalimide (BAF-HPI) or a non-cardo-type monomer such as 1,5-naphthalenediol (1,5-NP), 2,6-naphthalenediol (2,6-NP) or 4,4'-bisphenol (BP) with an alkali metal.

The alkali metal base used in the preparation of the aromatic diol salt may be any one of NaOH, KOH and $K_2CO_3$. But, when NaOH or KOH is used, the molar equivalence of the metal base and the aromatic diol should be exactly the same, and the water prepared during the preparation of the aromatic diol salt should be removed by distillation in order to obtain a polymer with a large molecular weight. To avoid these difficulties, $K_2CO_3$ which does not have a significant effect on condensation polymerization when used in excess with respect to the aromatic diol may be used. The alkali metal base may be used in an amount of about 1.0-10 wt % in excess based on the cardo-type aromatic diol.

The halogen of the aromatic dihalogen compound may be fluorine or chlorine. Especially, 4-fluoro-4'-(4-fluorobenzoylphenyloxy)diphenylsulfone may be used.

The polymerization solvent used in the present disclosure may be a polar solvent with a high boiling point such as dimethylformamide (DMF), dimethylacetamide (DMAc), dimethyl sulfoxide (DMSO), diphenylsulfone (DPS), hexamethylphosphoramide (HMPA) or sulfolane. More specifically, sulfolane, dimethyl sulfoxide (DMSO) or diphenylsulfone (DPS) may be used.

Polymerization temperature is determined by the organic solvent used. Usually, the condensation polymerization may be carried out at 150-250° C. for 3-12 hours.

The amorphous polyarylene ether polymers represented by the chemical formula (1) prepared according to the present disclosure have a novel repeating structure in which cardo-type aromatic diol-derived ether phenylene (—O—Ar—) groups having a large molecular volume, amorphous polyether sulfone

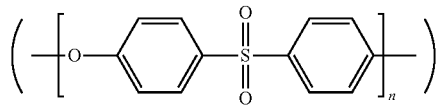

groups and crystalline polyether ketone

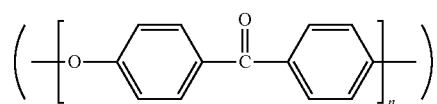

groups are alternatingly arranged. The amorphous polyether sulfone with superior transparency, electrical insulation and film formability but relatively poor heat resistance and mechanical properties and the crystalline polyether ketone having very superior chemical resistance, heat resistance and mechanical properties (low CTE) but poor film formability due to low solubility complement each other. As a result, a novel polymer material having superior transparency and heat resistance as well as low hygroscopy and contraction can be prepared.

MODE FOR INVENTION

The examples and experiments will now be described. The following examples and experiments are for illustrative purposes only and not intended to limit the scope of the present disclosure.

Example 1

Synthesis of Diol Monomer (BPF)

BPF was synthesized as an aromatic diol monomer. 9H-Fluorene-9-one (3 g, 16.7 mmol), phenol (3.03 mL, 34.48 mmol) and methylene chloride (MC, 8 mL) were added to a 25-mL 3-bulb flask. After stirring well and adding 3-mercaptopropanoic acid (0.013 mL, 0.15 mmol) and methanesulfonic acid (1.2 mL, 18.6 mmol), the resulting solution was further stirred at 48° C. for 30 minutes. Subsequently, after stirring at 40° C. for 12 hours, the solution was cooled at room temperature for an hour and then filtered. The filtrate was washed with a small amount of MC and water to obtain BPF. The resulting solid was recrystallized with MC to obtain pure BPF (yield: 75%) of the following structure. Melting temperature was 225° C.

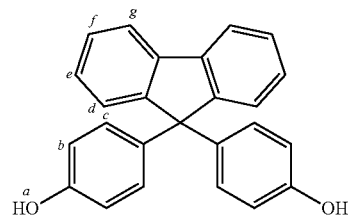

(d-1)

$^1$H-NMR (CDCl$_3$; ppm): g, 7.75 (d, 2H); d, e, f, 7.35 (m, 6H); c, 7.07 (d, 4H); b, 6.65 (d, 4H); a, 4.63 (s, 2H).

Example 2

Synthesis of Diol Monomer (1,3-BPA)

1,3-Bis(4-hydroxyphenyl)adamantane (1,3-BPA) was synthesized as an aromatic diol monomer. First, 1,3-dibromoadamantane (1.876 g, 6.38 mmol) and phenol (28.1 mL, 0.32 mol) was added to a 50 mL 3-bulb flask, slowly heated to 185° C. under nitrogen atmosphere and stirred for 5 hours. After dissolving in 10 mL methanol, followed by precipitating in water (200 mL) at 60° C., the precipitate was filtered from the hot solution and then purified with MC and water. Thus obtained 1,3-BPA was recrystallized with MC to obtain pure 1,3-BPA (yield: 75%) of the following structure. Melting temperature was 200° C.

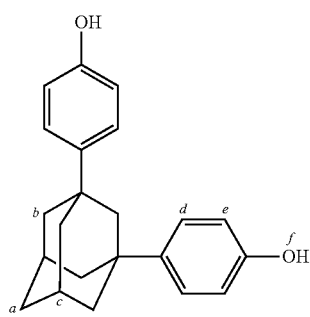

(d-2)

¹H-NMR (DMSO-d$_6$; ppm): f, 9.12 (s, 2H); e, 7.19 (d, 4H); d, 6.68 (d, 4H); c, 2.20 (s, 2H); b, 1.80 (s, 10H); a, 1.69 (s, 2H).

Example 3

Synthesis of Diol Monomer (2,2-BPA)

2,2-Bis(4-hydroxyphenyl)adamantane (2,2-BPA) was synthesized as an aromatic diol monomer. 2-Adamantanone (4.0 g, 26.6 mmol), phenol (18.74 mL, 213 mmol) and 1-hexanethiol (0.24 mL, 1.69 mmol) were added to a 50-mL 2-bulb flask and stirred at 80° C. After the reactants were completely dissolved, H$_2$SO$_4$ (1.49 mL, 26.6 mmol) was added and reaction was performed under nitrogen flow for 24 hours. After the reaction was completed, the reaction solution was cooled to 50° C. and, after adding to 20 mL of water, extracted 3 times with 40 mL of chloroform. The organic layer was washed 3 times with 40 mL of water and water was removed from the organic layer by adding MgSO$_4$, stirring and filtering. After removing the solvent by distillation under reduced pressure, followed by recrystallization with ethanol, pure 2,2-bis(4-hydroxyphenyl)adamantane (2,2-BPA, yield: 43%) was obtained. Melting temperature was 318° C.

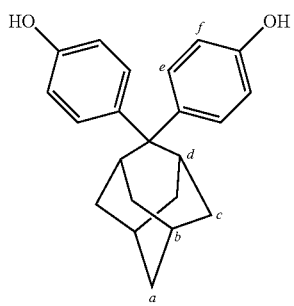

(d-3)

¹H-NMR (DMSO, ppm): a, c, 1.63 (m, 6H); b, 1.72 (s, 2H); c, 1.89 (d, 4H); d, 3.16 (s, 2H); e, 7.13 (m, 4H); f, 6.56 (d, 4H); OH, 9.02 (s, 2H).

Example 4

Diol Monomer (BPC)

BPC of the following structure was purchased from Aldrich as an aromatic diol monomer and used after recrystallizing 2 times with MC (yield: 80%).

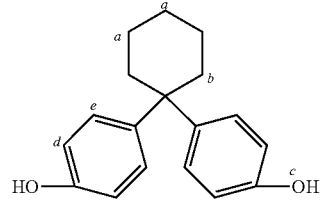

(d-4)

¹H-NMR (CDCl$_3$; ppm): e, 7.20 (d, 2H); d, 6.70 (d, 2H); c, 4.30 (s, 2H); b, 2.20 (t, 4H); a, 1.50 (m, 6H).

Example 5

Diol Monomer (DHAD)

DHAD of the following structure was purchased from Aldrich as an aromatic diol monomer and used after recrystallizing 2 times with ethanol (yield: 32%).

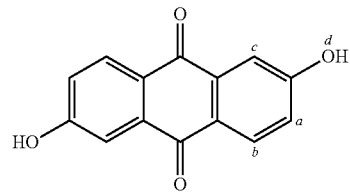

(d-5)

¹H-NMR (DMSO-d$_6$; ppm): d, 10.9 (s, 2H); c, 8.15 (s, 2H); b, 7.55 (s, 2H); a, 7.20 (s, 2H).

Example 6

Synthesis of Diol Monomer (BAF-HPI)

9,9-Bis(4-aminophenyl)fluorene-4-hydroxyphthalimide (BAF-HPI) was synthesized as an aromatic diol monomer. 4,4'-(9-Fluorenyldiene)dianiline (1.5 g, 4.28 mmol), 4-hydroxyphthalic anhydride (1.4 g, 8.54 mmol), NMP (5.5 mL) and o-xylene (3.22 mL) were added to a 25-mL 3-bulb flask equipped with the Dean-stark apparatus and stirred well until the reactants were dissolved. The resulting solution was refluxed at 190° C. for 5.5 hours to remove water via azeotropic distillation. After the reaction, the solution was cooled to 30° C. and then precipitated in 400 mL of methanol. The precipitate was washed with 150 mL of ether, dried in vacuum, dissolved in THF (10 mL), and then precipitated again in petroleum ether. The resulting precipitate was dried for 24 hours in vacuum to obtain pure BAF-HPI (yield: 83%). Melting temperature was 400° C.

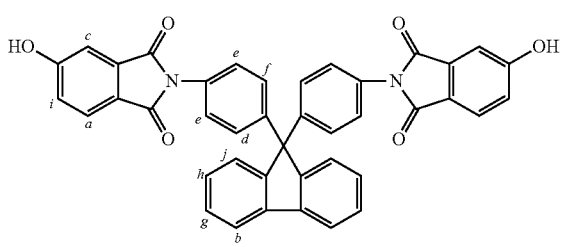

(d-6)

¹H-NMR (DMSO, ppm): a, 7.87 (d, 2H); b, 7.78 (d, 2H); c, 7.72 (d, 2H); d, 7.55 (q, 2H); e, 7.38 (d, 2H); f, g, 7.28 (d, 4H); h, 7.13 (d 2H); i, j, 6.99 (q, 4H).

Examples 7-9

Preparation of Non-Cardo-Type Monomers

Non-cardo-type monomers 1,5-naphthalenediol (1,5-NP), 2,6-naphthalenediol (2,6-NP) and 4,4'-bisphenol (BP) were purchased from Aldrich. After confirming that they are pure materials from $^1$H-NMR spectra, they were used for polymerization without further purification. Chemical structures and $^1$H-NMR data of the non-cardo-type aromatic diols are as follows.

1,5-Naphthalenediol (1,5-NP)

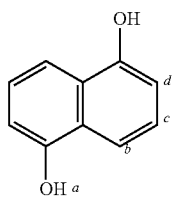

(d-7)

$^1$H-NMR (DMSO, ppm): a, 9.88 (s, 2H); b, 7.55 (d, 2H); c, 7.20 (t, 2H); d, 6.82 (d, 2H).

2,6-Naphthalenediol (2,6-NP)

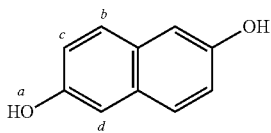

(d-8)

$^1$H-NMR (DMSO, ppm): a, 9.30 (s, 2H); b, 7.51 (d, 2H); c, 6.97 (d, 2H); d, 7.00 (s, 2H).

4,4'-Bisphenol (BP)

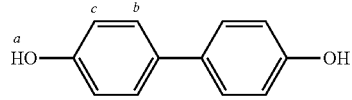

(d-9)

$^1$H-NMR (DMSO, ppm): a, 9.36, (s, 2H); b, 7.36, (d, 4H); c, 6.79, (d, 4H).

Example 10

Synthesis of Dihalogen Monomer (FBPODS)

4-Fluoro-4'-(4-fluorobenzoylphenyloxy)diphenylsulfone (FBPODS) was synthesized as an aromatic dihalogen monomer. FHB (1.146 g, 5.3 mmol) and DPS (1.360 g, 5.35 mmol) were added to a 250-mL 3-bulb flask under nitrogen flow. After adding sulfolane (8 mL) and completely dissolving the reactants at room temperature, the resulting solution was stirred for 10 minutes. After adding K$_2$CO$_3$ (3.84 g, 2.78 mmol) and raising the temperature of the reaction solution to 160° C., reaction was performed for 6 hours. After the reaction was completed, the reaction solution was cooled to 50° C., precipitated in 80 mL of hot water, and then filtered. After washing 3 times with hot water and methanol, respectively, excess salts and unreacted reactants were completely removed. Thus obtained solid was distilled under reduced pressure (0.1 torr, 296° C.) to obtain pure FBPODS (yield: 75%) of the following structure. Melting temperature was 162° C.

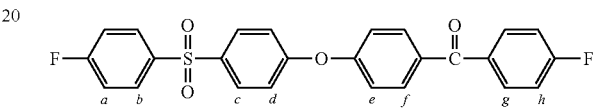

$^1$H-NMR (CDCl$_3$, ppm): b, c 7.95 (m, 4H); f, g 7.82 (m, 4H); a, d, e, h 7.13 (m, 8H).

Example 11

Synthesis of Poly(BPF/FBPODS) Polymer

BPF (1 g, 2.85 mmol), FBPODS (1.30 g, 2.88 mmol) and sulfolane (6.1 mL) were added to a 25 mL 3-bulb flask under nitrogen flow and stirred at 80° C. for 30 minutes. After adding K$_2$CO$_3$ (0.41 g, 2.99 mmol) to the resulting solution and stirring for 1 hour, polymerization was performed at 220° C. for 10 hours. The polymerization solution was cooled to 30° C. and, after adding chloroform (20 mL), KF formed during the polymerization and excess K$_2$CO$_3$ were removed via precipitation. After filtration, the polymerization solution was precipitated in 400 mL of methanol and then filtered. The precipitated solid was washed 3 times with excess acetone and hot water to remain trace amounts of monomers and salts remaining after the polymerization. Thus obtained solid was dissolved in chloroform, precipitated again in excess methanol, filtered, and dried in vacuum at 80° C. for 24 hours to obtain a pure poly(BPF/FBPODS) polymer (1.51 g).

Conversion ratio, number-average molecular weight (M$_n$), molecular weight distribution and glass transition temperature (T$_g$) of the synthesized polymer were 85%, 36,600, 1.74 and 245° C., respectively.

The synthesized polymer was a novel polyarylene ether-based poly(BPF/FBPODS) polymer having a repeating structure in which cardo-type bis(ether phenylene)fluorene, amorphous polyether sulfone and crystalline polyether ketone are alternatingly arranged.

(2)

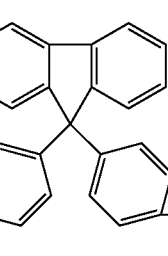
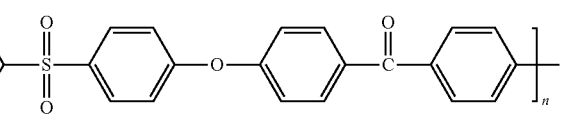

Example 12

Synthesis of Poly(1,3-BPA/FBPODS) Polymer

BPA (1 g, 3.12 mmol), FBPODS (1.421 g, 3.15 mmol) and sulfolane (6.1 mL) were added to a 25 mL 3-bulb flask under nitrogen flow and stirred at 80° C. for 30 minutes. After adding K$_2$CO$_3$ (0.45 g, 3.28 mmol) to the resulting solution and stirring for 1 hour, polymerization was performed at 220° C. for 10 hours. The polymerization solution was cooled to 30° C. and, after adding chloroform (20 mL) and stirring for 1 hour, polymerization was performed at 220° C. for 20 hours. The polymerization solution was cooled to 30° C. and, after adding chloroform (20 mL), KF formed during the polymerization and excess K$_2$CO$_3$ were removed via precipitation. After filtration, the polymerization solution was precipitated in 400 mL of methanol. Then, a pure poly(BPA/FBPODS) polymer was prepared according to the same purification procedure of Example 11.

Conversion ratio, number-average molecular weight (M$_n$), molecular weight distribution and glass transition temperature (T$_g$) of the synthesized polymer were 83%, 20,200, 1.57 and 208° C., respectively.

The synthesized polymer was a novel polyarylene ether-based poly(BPA/FBPODS) polymer having a repeating structure in which cardo-type bis(ether phenylene)adamantane, amorphous polyether sulfone and crystalline polyether ketone are alternatingly arranged.

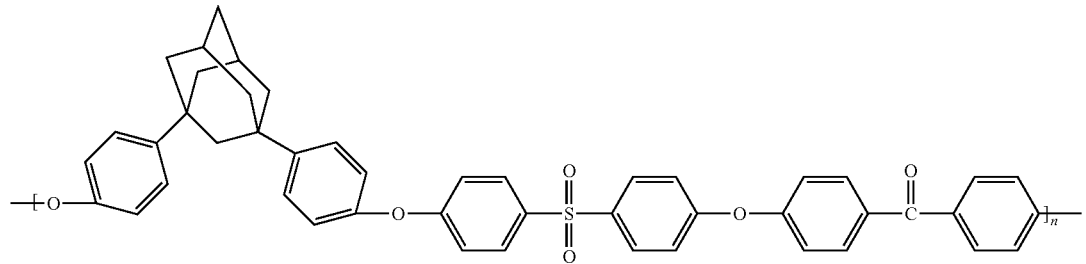

Example 13

Synthesis of Poly(BPC/FBPODS) Polymer

BPC (0.4 g, 1.49 mmol), FBPODS (0.678 g, 1.51 mmol) and sulfolane (6.1 mL) were added to a 25 mL 3-bulb flask under nitrogen flow and stirred at 80° C. for 30 minutes. After adding K$_2$CO$_3$ (0.216 g, 1.56 mmol) to the resulting solution and stirring for 1 hour, polymerization was performed at 220° C. for 10 hours. The polymerization solution was cooled to 30° C. and, after adding chloroform (20 mL), KF formed during the polymerization and excess K$_2$CO$_3$ were removed via precipitation. After filtration, the polymerization solution was precipitated in 400 mL of methanol. Then, a pure poly(BPC/FBPODS) polymer was prepared according to the same purification procedure of Example 11.

Conversion ratio, number-average molecular weight (M$_n$), molecular weight distribution and glass transition temperature (T$_g$) of the synthesized polymer were 98%, 24,500, 2.17 and 192° C., respectively.

The synthesized polymer was a novel polyarylene ether-based poly(BPC/FBPODS) polymer having a repeating structure in which cardo-type bis(ether phenylene)cyclohexane, amorphous polyether sulfone and crystalline polyether ketone are alternatingly arranged.

(4)

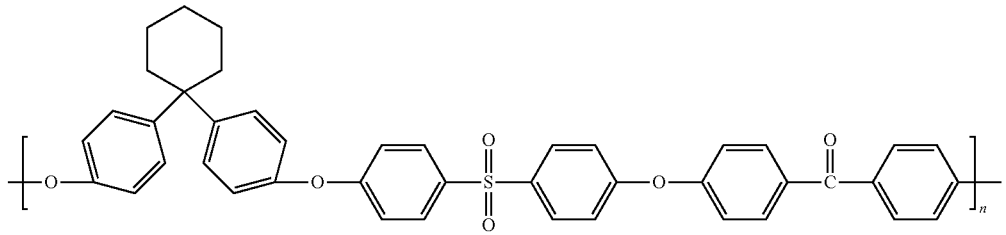

Example 14

Synthesis of Poly(0.7BPF-0.3-1,3BPA/FBPODS) Polymer

BPF (0.54 g, 1.54 mmol), 1,3-BPA (0.21 g, 0.66 mmol), FBPODS (1.0 g, 2.22 mmol, 1 mol % excess) and sulfolane (16.30 mL) were added to a 25 mL 3-bulb flask under nitrogen flow. After completely dissolving at 80° C., the resulting solution was stirred for 30 minutes. After adding K$_2$CO$_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess K$_2$CO$_3$ were removed via precipitation followed by filtration. The filtrate was precipitated in 400 mL of methanol. Then, a pure poly(0.7BPF-0.3-1,3BPA/FBPODS) polymer was prepared according to the same purification procedure of Example 11. Conversion ratio, number-average molecular weight (M$_n$), molecular weight distribution and glass transition temperature (T$_g$) of the synthesized polymer were 77%, 16,500, 1.75 and 234° C., respectively.

The synthesized polymer was a novel polyarylene ether-based poly(0.7BPF-0.3-1,3BPA/FBPODS) polymer having a repeating structure in which cardo-type bis(ether phenylene)adamantane, cardo-type bis(ether phenylene)fluorene, amorphous polyether sulfone and crystalline polyether ketone are alternatingly arranged.

(3)

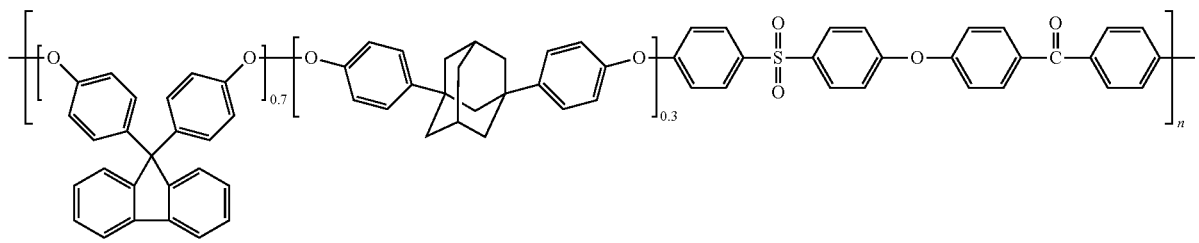

(5)

Example 15
Synthesis of Poly(0.75BPF-0.15-1,3BPA-0.1BAF-HPI/FBPODS) Polymer BPF (0.58 g, 1.64 mmol), 1,3-BPA (0.18 g, 0.55 mmol), BAF-HPI (0.13 g, 0.22 mmol), FBPODS (1.0 g, 2.22 mmol, 1 mol % excess) and sulfolane (17.60 mL) were added to a 25 mL 3-bulb flask under nitrogen flow. After completely dissolving at 80° C., the resulting solution was stirred for 30 minutes. After adding $K_2CO_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess $K_2CO_3$ were removed via precipitation followed by filtration. The filtrate was precipitated in 400 mL of methanol. Then, a pure poly(0.75BPF-0.15-1,3BPA-0.1BAF-HPI/FBPODS) polymer was prepared according to the same purification procedure of Example 11. Conversion ratio, number-average molecular weight ($M_n$), molecular weight distribution and glass transition temperature ($T_g$) of the synthesized polymer were 80%, 9,500, 1.63 and 243° C., respectively.

The synthesized polymer was a novel polyarylene ether-based poly(0.75BPF-0.15-1,3BPA-0.1BAF-HPI/FBPODS) polymer having a repeating structure in which cardo-type bis(ether phenylene)adamantane, cardo-type bis(ether phenylene)fluorene having an imide group, amorphous polyether sulfone and crystalline polyether ketone are alternatingly arranged.

Example 16
Synthesis of Poly(2,2-BPA/FBPODS) Polymer 2,2-BPA (0.7 g, 2.19 mmol), FBPODS (1.0 g, 2.22 mmol, 1 mol % excess) and sulfolane (15.83 mL) were added to a 25 mL 3-bulb flask under nitrogen flow. After completely dissolving at 80° C., the resulting solution was stirred for 30 minutes. After adding $K_2CO_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess $K_2CO_3$ were removed via precipitation followed by filtration. The filtrate was precipitated in 400 mL of methanol. Then, a pure poly(2,2-BPA/FBPODS) polymer was prepared according to the same purification procedure of Example 11. Conversion ratio, number-average molecular weight ($M_n$), molecular weight distribution and glass transition temperature ($T_g$) of the synthesized polymer were 75%, 21,900, 1.52 and 247° C., respectively.

The synthesized polymer was a novel polyarylene ether-based poly(2,2-BPA/FBPODS) polymer having a repeating structure in which cardo-type bis(ether phenylene)adamantane, amorphous polyether sulfone and crystalline polyether ketone are alternatingly arranged.

(6)

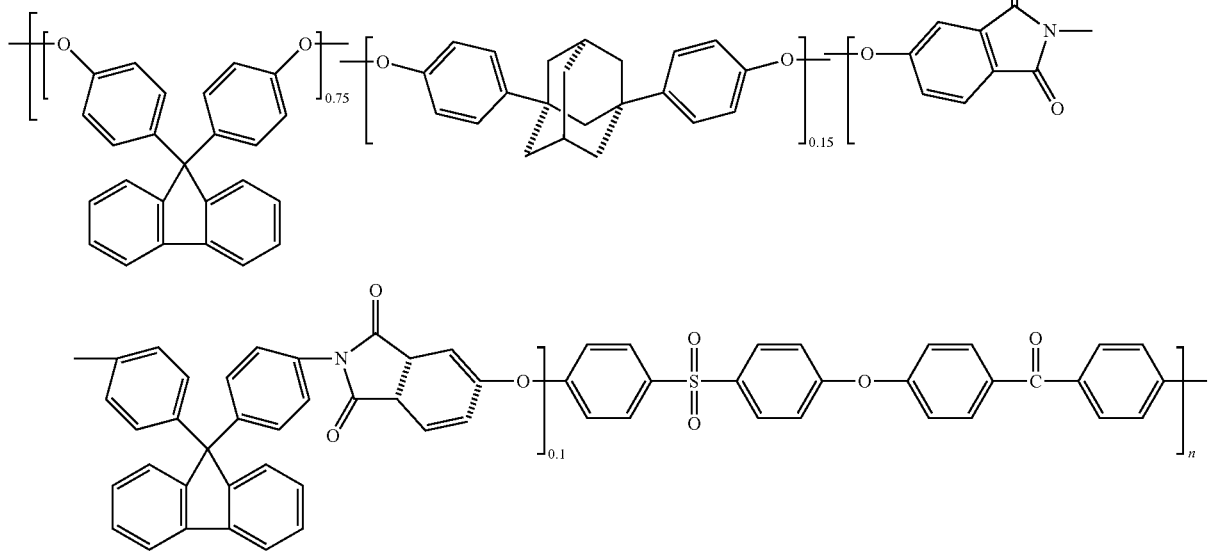

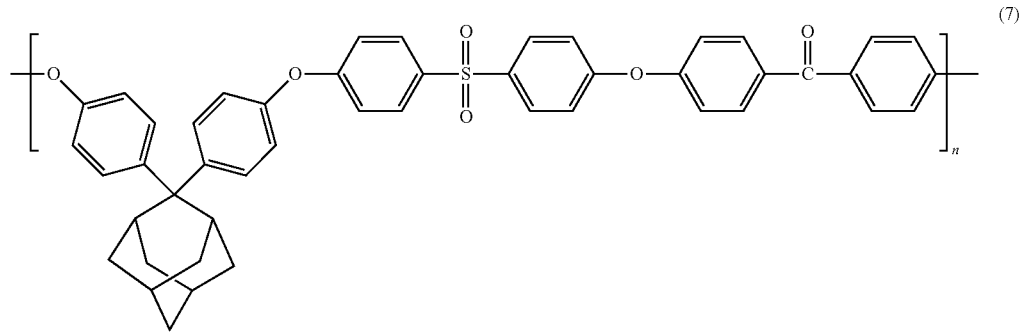

(7)

Example 17

Synthesis of Poly(0.3-2,2BPA-0.7BPF/FBPODS) Polymer

BPF (0.54 g, 1.53 mmol), 2,2-BPA (0.21 g, 0.66 mmol), FBPODS (1.0 g, 2.22 mmol, 1 mol % excess) and sulfolane (13.8 mL) were added to a 25 mL 3-bulb flask under nitrogen flow. After completely dissolving at 80° C., the resulting solution was stirred for 30 minutes. After adding $K_2CO_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess $K_2CO_3$ were removed via precipitation followed by filtration. The filtrate was precipitated in 400 mL of methanol. Then, a pure poly(0.3-2,2BPA-0.7BPF/FBPODS) polymer was prepared according to the same purification procedure of Example 11. Conversion ratio, number-average molecular weight ($M_n$), molecular weight distribution and glass transition temperature ($T_g$) of the synthesized polymer were 86%, 40,300, 1.37 and 244° C., respectively.

The synthesized polymer was a novel polyarylene ether-based poly(0.3-2,2BPA-0.7BPF/FBPODS) polymer having a repeating structure in which cardo-type bis(ether phenylene) adamantane, cardo-type bis(ether phenylene)fluorene, amorphous polyether sulfone and crystalline polyether ketone are alternatingly arranged.

Example 18

Synthesis of Poly(0.7-2,2BPA-0.3BPF/FBPODS) Polymer

BPF (0.23 g, 0.66 mmol), 2,2-BPA (0.49 g, 1.53 mmol), FBPODS (1.0 g, 2.22 mmol, 1 mol % excess) and sulfolane (13.6 mL) were added to a 25 mL 3-bulb flask under nitrogen flow. After completely dissolving at 80° C., the resulting solution was stirred for 30 minutes. After adding $K_2CO_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess $K_2CO_3$ were removed via precipitation followed by filtration. The filtrate was precipitated in 400 mL of methanol. Then, a pure poly(0.7-2,2BPA-0.3BPF/FBPODS) polymer was prepared according to the same purification procedure of Example 11. Conversion ratio, number-average molecular weight ($M_n$), molecular weight distribution and glass transition temperature ($T_g$) of the synthesized polymer were 85%, 27,000, 1.51 and 243° C., respectively.

The synthesized polymer was a novel polyarylene ether-based poly(0.7-2,2BPA-0.3BPF/FBPODS) polymer having a repeating structure in which cardo-type bis(ether phenylene) adamantane, cardo-type bis(ether phenylene)fluorene, amorphous polyether sulfone and crystalline polyether ketone are alternatingly arranged.

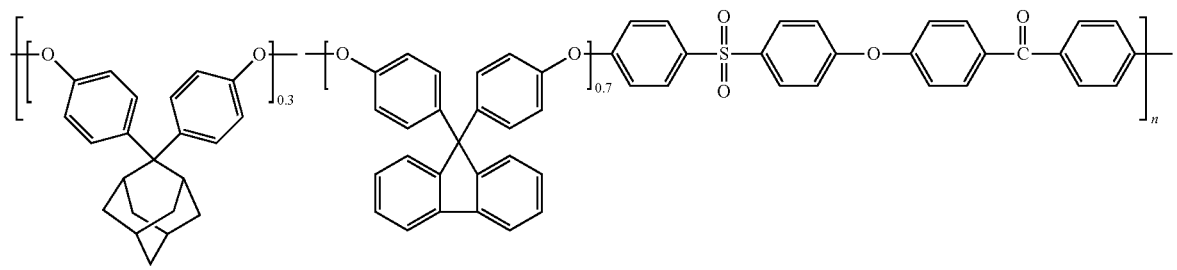

(8)

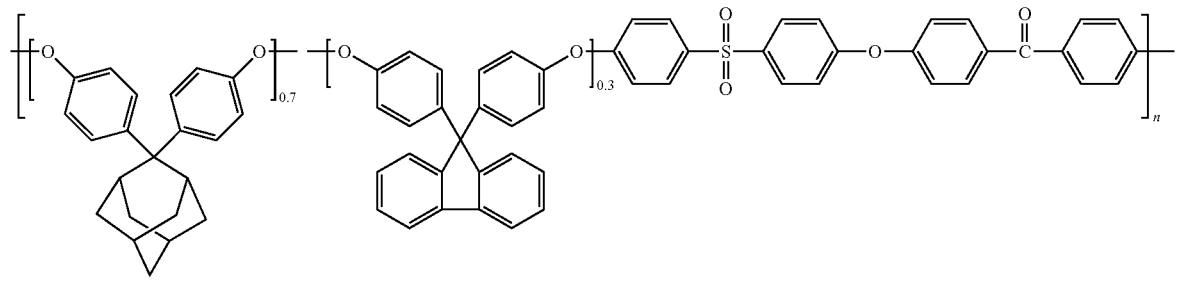

(9)

Example 19

Synthesis of Poly(0.8BPF-0.2-1,5NP/FBPODS) Polymer

BPF (0.61 g, 1.75 mmol), 1,5-NP (0.07 g, 0.44 mmol), FBPODS (1.0 g, 2.22 mmol, 1 mol % excess) and sulfolane (15.65 mL) were added to a 25 mL 3-bulb flask under nitrogen flow. After completely dissolving at 80° C., the resulting solution was stirred for 30 minutes. After adding $K_2CO_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess $K_2CO_3$ were removed via precipitation followed by filtration. The filtrate was precipitated in 400 mL of methanol. Then, a pure poly(0.8BPF-0.2-1,5NP/FBPODS) polymer was prepared according to the same purification procedure of Example 11. Conversion ratio, number-average molecular weight ($M_n$), molecular weight distribution and glass transition temperature ($T_g$) of the synthesized polymer were 82%, 20,100, 1.47 and 235° C., respectively.

The synthesized polymer was a novel polyarylene ether-based poly(0.8BPF-0.2-1,5NP/FBPODS) polymer having a repeating structure in which naphthalene, amorphous polyether sulfone and crystalline polyether ketone are alternatingly arranged.

Example 20

Synthesis of Poly(0.8BPF-0.2-2,6NP/FBPODS) Polymer

BPF (0.61 g, 1.75 mmol), 2,6-NP (0.07 g, 0.44 mmol), FBPODS (1.0 g, 2.22 mmol, 1 mol % excess) and sulfolane (15.65 mL) were added to a 25 mL 3-bulb flask under nitrogen flow. After completely dissolving at 80° C., the resulting solution was stirred for 30 minutes. After adding $K_2CO_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess $K_2CO_3$ were removed via precipitation followed by filtration. The filtrate was precipitated in 400 mL of methanol. Then, a pure poly(0.8BPF-0.2-2,6NP/FBPODS) polymer was prepared according to the same purification procedure of Example 11. Conversion ratio, number-average molecular weight ($M_n$), molecular weight distribution and glass transition temperature ($T_g$) of the synthesized polymer were 80%, 15,600, 1.36 and 234° C., respectively.

The synthesized polymer was a novel polyarylene ether-based poly(0.8BPF-0.2-2,6NP/FBPODS) polymer having a repeating structure in which naphthalene, amorphous polyether sulfone and crystalline polyether ketone are alternatingly arranged.

(10)

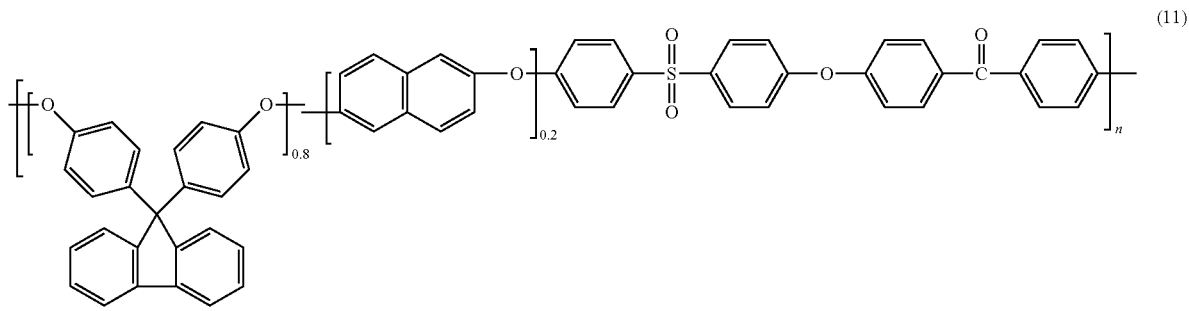

(11)

Example 21

Synthesis of Poly(0.8BPF-0.2BP/FBPODS) Polymer

BPF (0.61 g, 1.75 mmol), BP (0.08 g, 0.44 mmol), FBPODS (1.0 g, 2.22 mmol, 1 mol % excess) and sulfolane (15.74 mL) were added to a 25 mL 3-bulb flask under nitrogen flow. After completely dissolving at 80° C., the resulting solution was stirred for 30 minutes. After adding $K_2CO_3$ (0.32 g, 2.33 mmol, 5 mol % excess) and stirring for 1 hour, reaction temperature was slowly raised to 160° C. After performing reaction for 5 hours, reaction was further performed at 220° C. for 10 hours. After cooling at 30° C. for 1 hour and adding chloroform (10 mL), KF formed during the polymerization and excess $K_2CO_3$ were removed via precipitation followed by filtration. The filtrate was precipitated in 400 mL of methanol. Then, a pure poly(0.8BPF-0.2BP/FBPODS) polymer was prepared according to the same purification procedure of Example 11. Conversion ratio, number-average molecular weight ($M_n$), molecular weight distribution and glass transition temperature ($T_g$) of the synthesized polymer were 86%, 19,200, 1.40 and 228° C., respectively.

The synthesized polymer was a novel polyarylene ether-based poly(0.8BPF-0.2BP/FBPODS) polymer having a repeating structure in which biphenol, amorphous polyether sulfone and crystalline polyether ketone are alternatingly arranged.

a) Molecular Weight

Number-average molecular weight ($M_n$), weight-average molecular weight ($M_w$) and molecular weight distribution ($M_w/M_n$) of the prepared polymers were measured by gel permeation chromatography (GPC) relative to standard polystyrene.

b) Phase Transition Temperature

Melting temperature ($T_m$) and glass transition temperature ($T_g$) of the synthesized monomers and polymers were measured by differential scanning calorimetry (DSC) under nitrogen atmosphere at a constant heating rate (20° C./min).

c) Thermal Stability

Thermal stability of the prepared polymers were determined by measuring initial decomposition temperature (1.0% loss decomposition temperature) and char yield (yield of polymer remaining without being decomposed at 600° C.) using a thermal gravimetric analyzer (TGA) under nitrogen atmosphere at a constant heating rate (20° C./min).

d) Coefficient of Thermal Expansion (CTE)

According to ASTM-E 831 (extension mode), a test sample film (thickness: 40-100 µm) was heated for 1 hour at a temperature 5° C. higher than the $T_g$ of the sample and CTE was measured using a thermo-mechanical analyzer (TMA).

e) Hygroscopy

According to ASTM-D570, a sample film (thickness: 40-100 µm) of a predetermined size (1 cm×1 cm) was dried at 110° C. for 24 hours in vacuum and then weighed. The film was kept in a constant-temperature bath of 23° C. for 24 hours. Then, after wiping water drops adhering on the film surface with filter paper, the weight of the film was measured.

f) Tensile Properties

According to ASTM-D882, a sample film (thickness: 40-100 µm) of a predetermined size (0.5×7.0 cm) was subjected to stress-strain measurement using the Instron instrument under the same condition (cross-head speed 10 mm/min). Tensile properties of the polymer film such as modulus, elongation at break and tensile strength were measured for the 3 identical sample films under the same condition and the average value was taken.

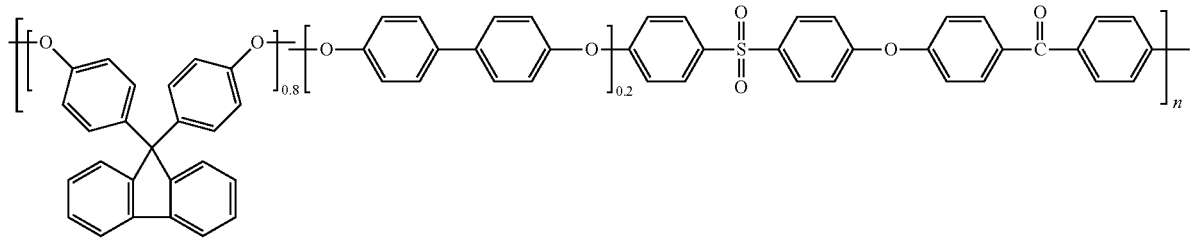

(12)

Test Example

Characterization of Polymers

The novel polyarylene ether-based transparent polymers with high heat resistance prepared above were confirmed to have amorphous structures by X-ray diffractometry. Molecular weight, thermal properties, transparency, CTE, film tensile properties and hygroscopy of the polymers were measured as described below. The result is given in Table 1 and Table 2. The synthesized novel polymers were dissolved in chloroform solvent to 5-10 wt % and prepared into 40-100 µm-thick films via solvent casting.

Table 1 shows the result of the physical property measurement of the polymers.

TABLE 1

| | Polymer sample | $T_g$ (°C.) | Transmittance (%) at 550 nm | Hygroscopy (%) at 23° C., 24 h | CTE (ppm) (temp. range, ° C.) |
|---|---|---|---|---|---|
| Ex. 11 | Poly(BPF/FBPODS) | 245 | 93 (40 μm) | .64 | 66 (50-150) |
| | | | | | 74 (50-200) |
| Ex. 12 | Poly(1,3-BPA/FBPODS) | 208 | 91 (45 μm) | 0.65 | 61 (50-100) |
| | | | | | 64 (50-200) |
| Ex. 14 | Poly(0.7BPF-0.3-1,3BPA/FBPODS) | 234 | 85 (35 μm) | 0.65 | 58.9 (50-200) |
| Ex. 15 | Poly(0.75BPF-0.15-1,3BPA-0.1BAF-HPI/FBPODS) | 243 | 70 (30 μm) | 0.77 | 67.5 (50-200) |
| Ex. 16 | Poly(2,2BPA/FBPODS) | 274 | 88 (30 μm) | 0.63 | 58.2 (50-200) |
| Ex. 17 | Poly(0.3-2,2BPA-0.7BPF/FBPODS) | 244 | 65 (75 μm) | 0.66 | 55 (60-100) |
| | | | | | 63 (50-200) |
| Ex. 18 | Poly(0.7-2,2BPA-0.3BPF/FBPODS) | 243 | 60 (60 μm) | 0.64 | 54 (60-100) |
| | | | | | 59 (50-200) |

Table 2 shows the result of the thermal property measurement of the polymers.

TABLE 2

| | Polymer sample | Initial decomp. temp. (° C.) | Tensile strength (MPa) | Modulus (MPa) | Elongation at break (%) |
|---|---|---|---|---|---|
| Ex. 11 | Poly(BPF/FBPODS) | 464 | 76 | 2,350 | 1.1 |
| Ex. 12 | Poly(1,3-BPA/FBPODS) | 439 | 45 | 1,785 | 4.5 |
| Ex. 14 | Poly(0.7BPF-0.3-1,3BPA/FBPODS) | 426 | 51 | 1,805 | 4.1 |
| Ex. 15 | Poly(0.75BPF-0.15-1,3BPA-0.1BAF-HPI/FBPODS) | 458 | 48 | 1,903 | 5.7 |
| Ex. 16 | Poly(2,2BPA/FBPODS) | 448 | 50 | 1,964 | 3.3 |
| Ex. 17 | Poly(0.3-2,2BPA-0.7BPF/FBPODS) | 453 | 68 | 2,143 | 21.2 |
| Ex. 18 | Poly(0.7-2,2BPA-0.3BPF/FBPODS) | 419 | 51 | 1,957 | 9.7 |
| Ex. 19 | Poly(0.8BPF-0.2-2,6NP/FBPODS) | 460 | 47 | 1,875 | 3.3 |

It was confirmed that the poly(arylene ether) polymers with novel structures synthesized using the novel aromatic dihalogen compound FBPODS as well as the cardo-type aromatic monomer diol or the cardo-type or non-cardo-type aromatic diol are both transparent and heat resistant and have superior hygroscopy properties.

For use as the substrate material for next-generation flexible displays, solar cells, electronic paper, it is preferred that CTE be low at high temperature, hygroscopy be low and transmittance at 550 nm be high.

As seen from [Table 1] and [Table 2], the CTE of the polymers according to the present disclosure is 58-74 ppm in the temperature range of 50-200° C. This value is comparable to or better than that of the commercially available Appear 3000 (Promerus COP, 74-112 ppm). And, hygroscopy (0.63-0.77%) of the polymers according to the present disclosure is superior about 4 times as compared to Neopulim (Mitsubishi Gas Chem PI, 2.1%) and more than 2 times as compared to PES (Sumitomo Bakelite, 1.4%).

Also, the transmittance is comparable to that of the commercially available products with 60-93%. In addition, the polymers according to the present disclosure are much superior in terms of thermal properties and heat resistance with $T_g$ 234-247° C. to PES (Sumitomo Bakelite, $T_g$=223° C.).

Since the poly(arylene ether) polymers according to the present disclosure satisfy the mechanical property requirements for next-generation flexible materials, they are highly likely to be useful as novel next-generation substrate materials.

INDUSTRIAL APPLICABILITY

The polyarylene ether polymer according to the present disclosure is both transparent and heat resistant and, thus, is suitable as a flexible plastic substrate material for use in next-generation roll-type displays, solar cells and electronic paper.

The invention claimed is:

1. A polyarylene ether polymer comprising a repeat unit represented by the chemical formula (1a) or (1b):

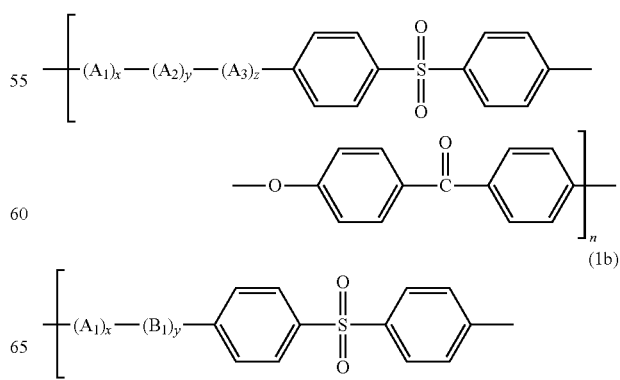

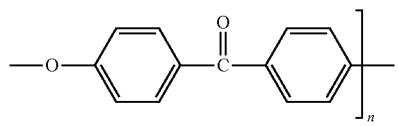

wherein at least one of $A_1$, $A_2$ and $A_3$ are cardo-type aromatic diol monomers selected from the compounds of the chemical formulae (d-2), (d-4), (d-5) and (d-6):

(d-2)
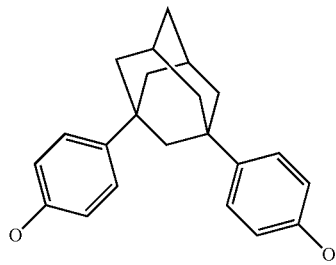

(d-4)
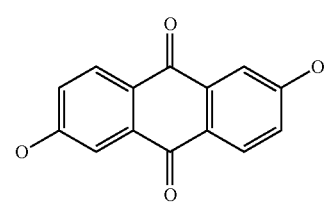

(d-5)
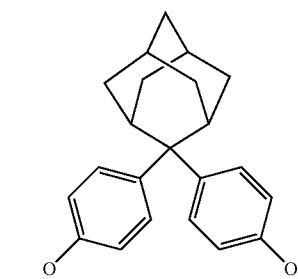

(d-6)
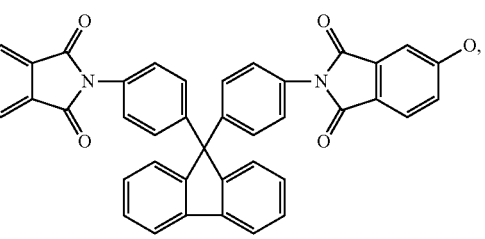

$B_1$ is a non-cardo-type aromatic diol monomer,
in the formula (1a), $x+y+z=1$, $0<x\le1$, $0\le y<1$ and $0\le z<1$,
in the formula (1b), $x+y=1$, $0<x\le1$ and $0\le y<1$, and
n is an integer from 1 to 780.

2. The polyarylene ether polymer of claim 1, wherein the polymer has a number-average molecular weight of 3,000-500,000.

3. The polyarylene ether polymer of claim 1, wherein the non-cardo-type aromatic diol monomer is selected from the compounds of the chemical formulae (d-7) to (d-9):

(d-7)
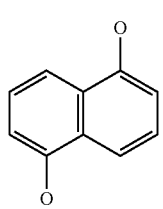

(d-8)
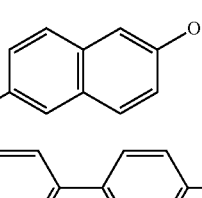

(d-9)
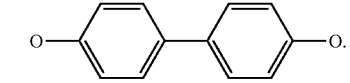

4. The polyarylene ether polymer of claim 1, which comprises a repeat unit selected from those represented by the chemical formulae (2) to (12):

(2)
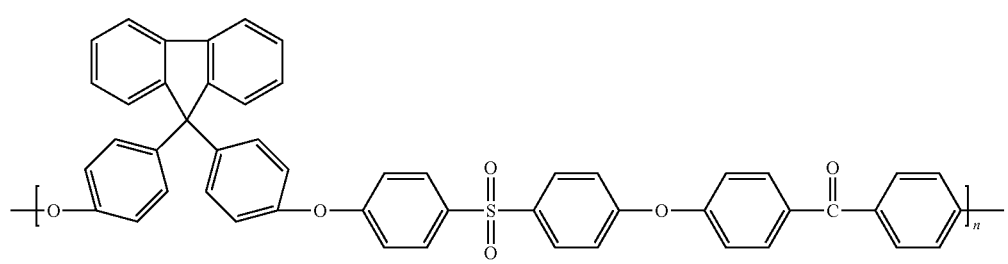

(3)
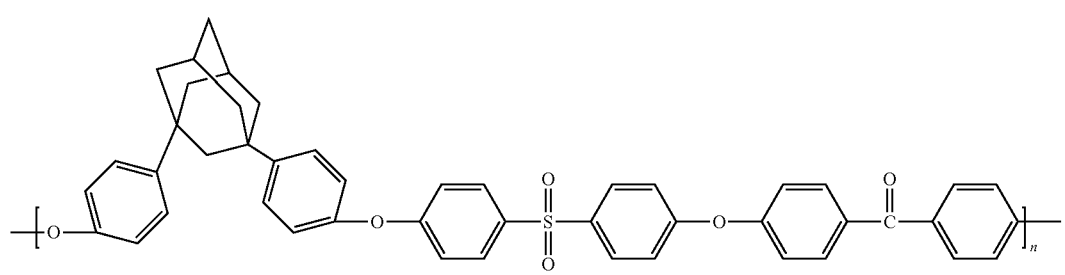

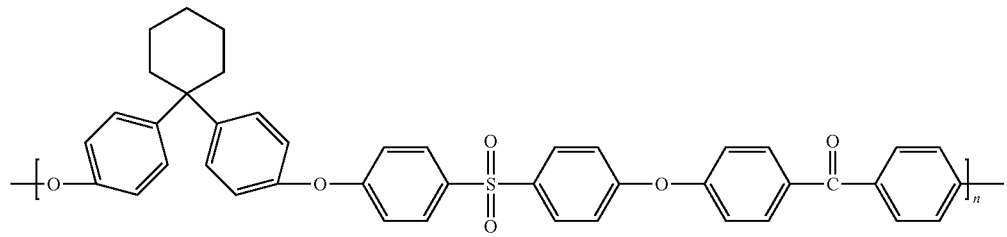
(4)
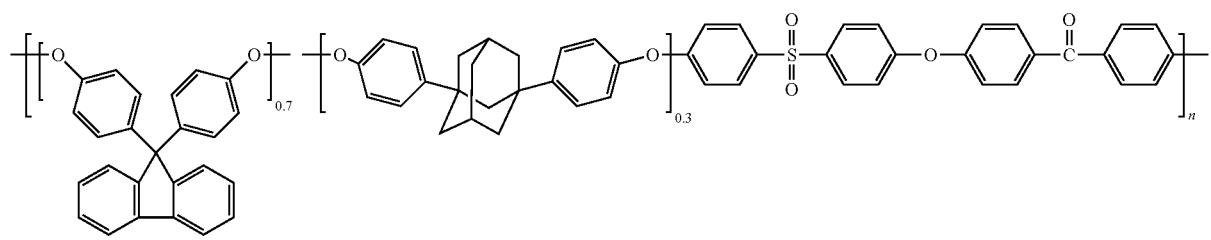
(5)
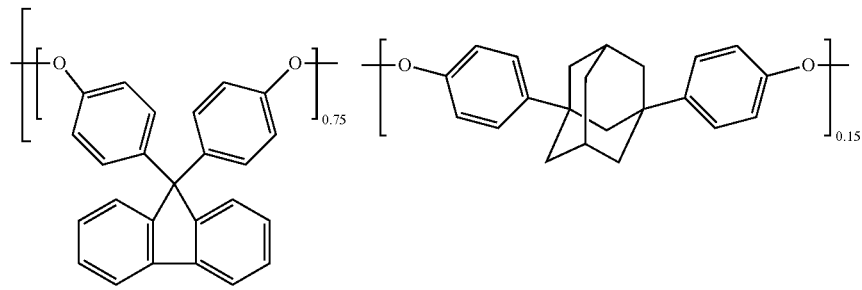
(6)
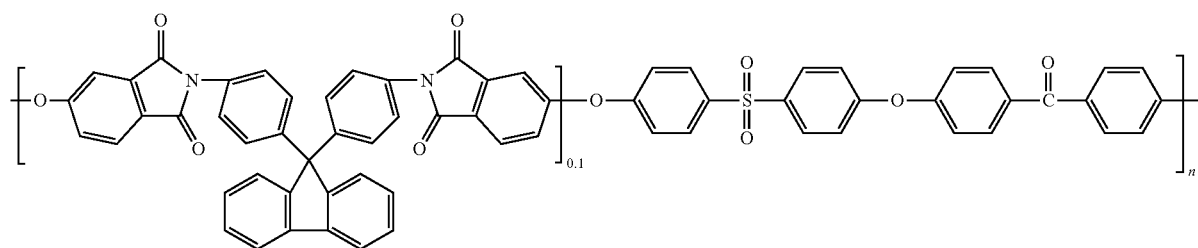
(7)
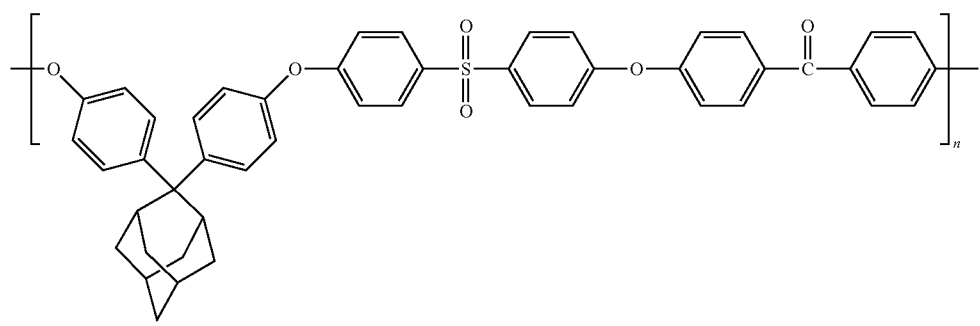

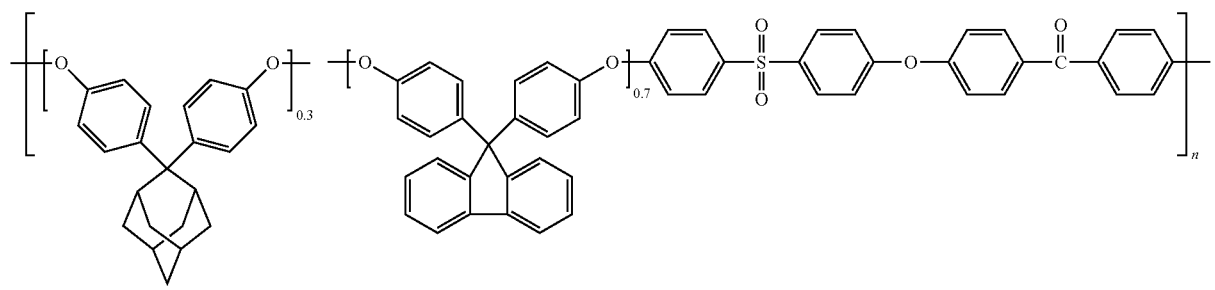
(8)
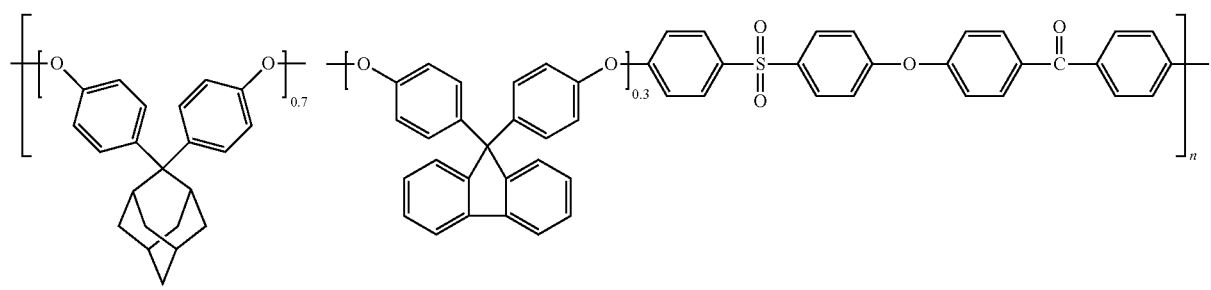
(9)
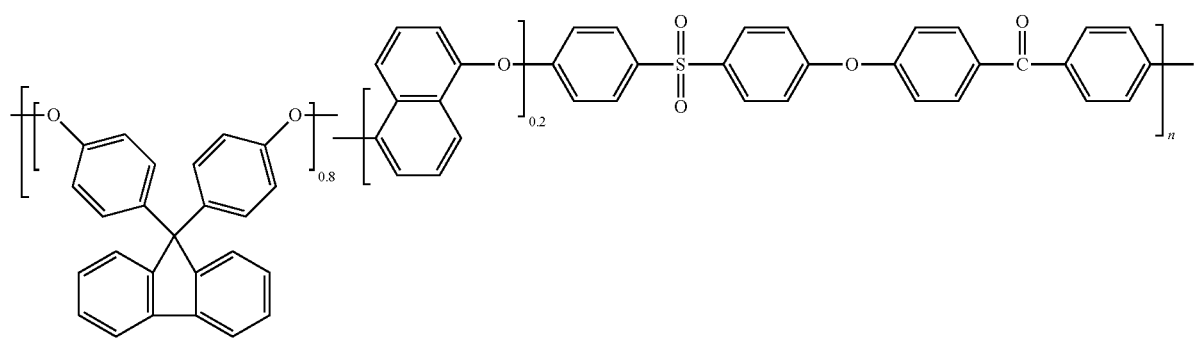
(10)
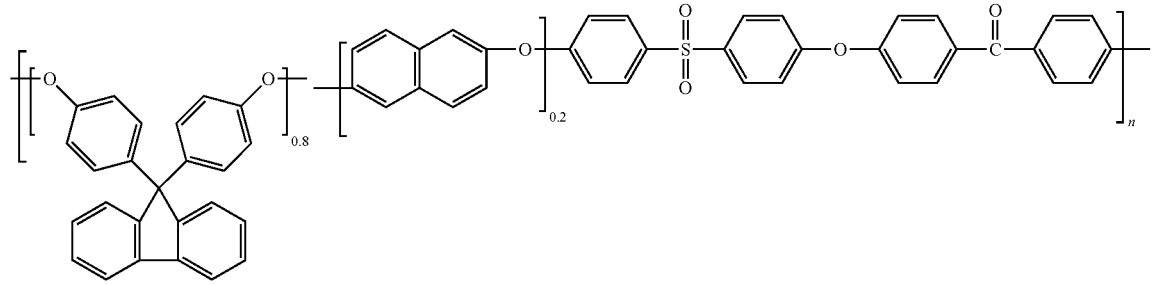
(11)
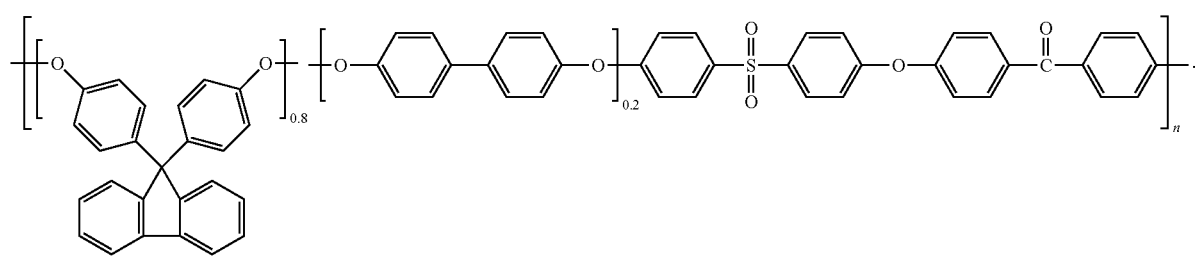
(12)

5. A method for preparing the polyarylene ether polymer of the chemical formula (1a) or (1b) of claim 1, comprising condensation polymerizing one or more aromatic diol salt with an aromatic dihalogen compound at molar equivalence ratio in a polar solvent via nucleophilic substitution.

6. The method for preparing a polyarylene ether polymer according to claim 5, wherein the aromatic diol salt is prepared by reacting an aromatic diol with an alkali metal base.

7. The method for preparing a polyarylene ether polymer according to claim 6, wherein the aromatic diol is one or more selected from a cardo-type aromatic diol compound including 9,9-bis(4-hydroxyphenyl)fluorene (BPF), 1,3-bis(4-hydroxyphenyl)adamantane (BPA), 1,1'-bis(4-hydroxyphenyl)cyclohexane (BPC), 2,6-dihydroxyanthracene-9,10-dione (DHAD) and 9,9-bis(4-aminophenyl)fluorene-4-hydroxyphhalimide (BAF-HPI) or a non-cardo-type monomer including 1,5-naphthalenediol (1,5-NP), 2,6-naphthalenediol (2,6-NP) and 4,4'-bisphenol (BP).

8. The method for preparing a polyarylene ether polymer according to claim 6, wherein the alkali metal base is one or more selected from a group consisting of NaOH, KOH and $K_2CO_3$.

9. The method for preparing a polyarylene ether polymer according to claim 6, wherein the alkali metal base is used in an amount of 1.0-10 wt % in excess based on the cardo-type aromatic diol.

10. The method for preparing a polyarylene ether polymer according to claim 5, wherein the halogen of the aromatic dihalogen compound is fluorine or chlorine.

11. The method for preparing a polyarylene ether polymer according to claim 10, wherein the aromatic dihalogen compound is 4-fluoro-4'-(4-fluorobenzoylphenyloxy)diphenylsulfone.

12. The method for preparing a polyarylene ether polymer according to claim 5, wherein the polar solvent is one or more selected from a group consisting of dimethylformamide (DMF), dimethylacetamide (DMAc), dimethyl sulfoxide (DMSO), diphenylsulfone (DPS), hexamethylphosphoramide (HMPA) and sulfolane.

13. The method for preparing a polyarylene ether polymer according to claim 6, wherein the condensation polymerization is carried out at 150-250° C.

14. The method for preparing a polyarylene ether polymer according to claim 6, wherein the condensation polymerization is carried out at for 3-12 hours.

15. The polyarylene ether polymer according to claim 1, wherein the repeat unit represented by the chemical formula (1a) or (1b) is selected from those represented by the chemical formulae (13) to (18):

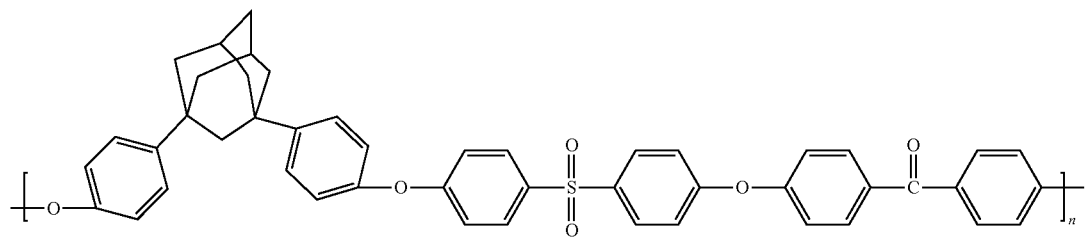

(13)

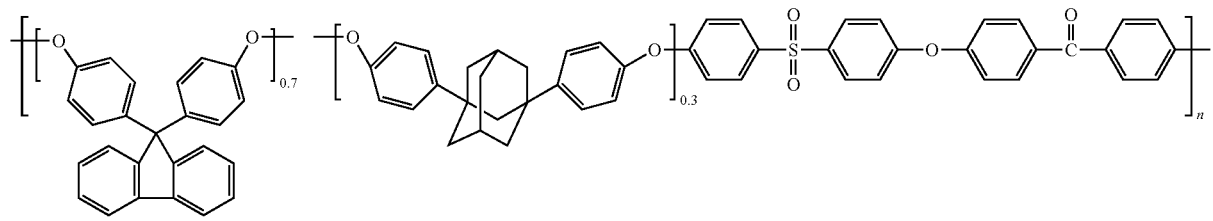

(14)

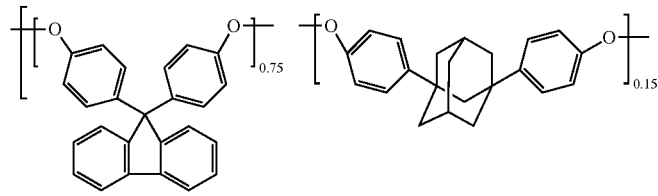

(15)

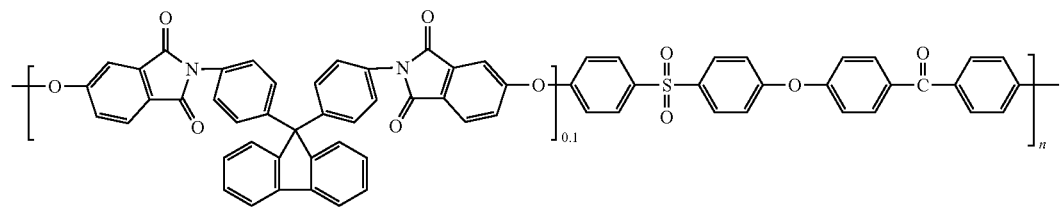

(16)
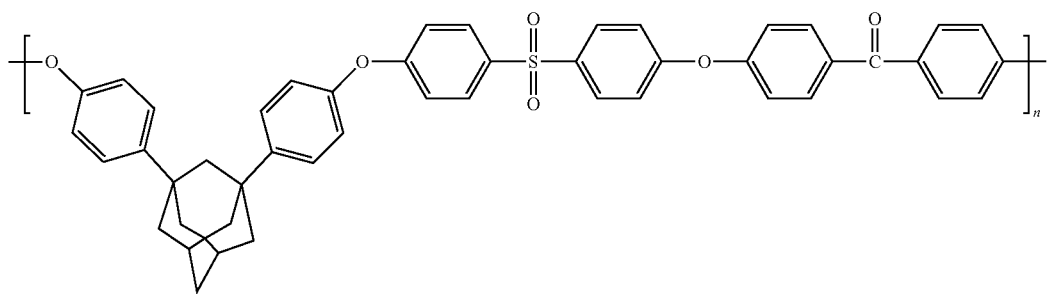
(17)
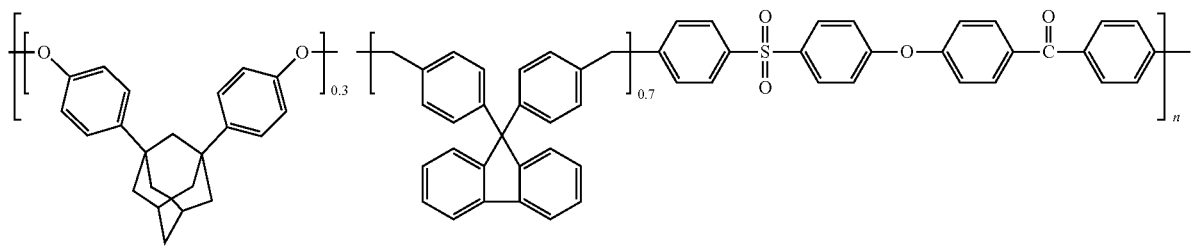
(18)
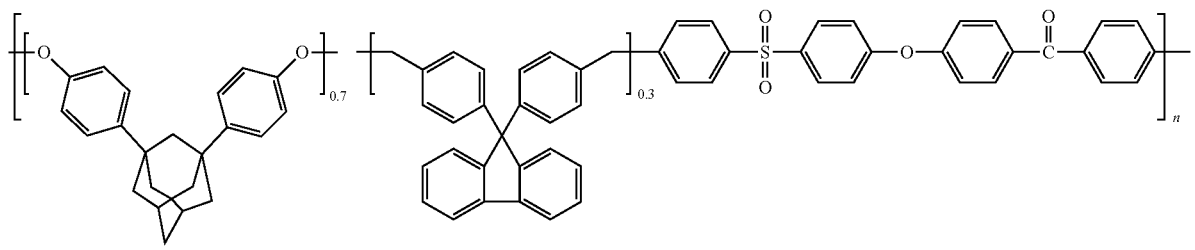
* * * * *

UNITED STATES PATENT AND TRADEMARK OFFICE
CERTIFICATE OF CORRECTION

PATENT NO. : 8,916,672 B2
APPLICATION NO. : 13/388783
DATED : December 23, 2014
INVENTOR(S) : Han et al.

Page 1 of 1

It is certified that error appears in the above-identified patent and that said Letters Patent is hereby corrected as shown below:

In the claims:
Column 39 and 40, the chemical formulae (17) and (18) should appear as follows:

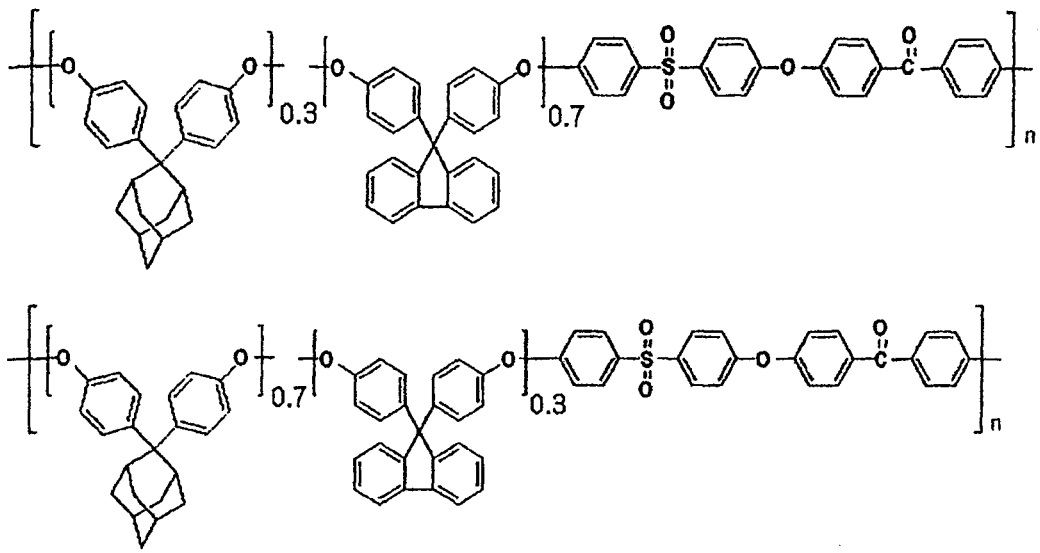

Signed and Sealed this
Fourteenth Day of July, 2015

Michelle K. Lee
*Director of the United States Patent and Trademark Office*